3,322,849
DEHYDROGENATION PROCESS
John M. McEuen, Detroit, Mich., assignor to Ethyl Corporation, New York, N.Y., a corporation of Virginia
No Drawing. Filed Jan. 3, 1966, Ser. No. 517,923
7 Claims. (Cl. 260—683.3)

The present invention relates to the dehydrogenation of saturated hydrocarbons. More particularly, the invention relates to a process for the catalytic dehydrogenation of higher molecular weight paraffins to the corresponding olefins.

The dehydrogenation of hydrocarbons per se is well known and many processes and catalysts were employed in the prior art to accomplish the dehydrogenation. Most of the known processes and catalysts, however, are concerned with dehydrogenation of paraffins having less than six carbon atoms, dehydrogenation of olefins to polyunsaturated olefins, or the dehydrogenation of paraffins having six or more carbon atoms to yield aromatic products. Very little is available in the prior art dealing with the dehydrogenation of paraffins having more than six carbon atoms to obtain corresponding olefins. Most of the known catalysts, such as for example the well known chromia-alumina dehydrogenation catalysts are not very effective for dehydrogenating paraffins to olefins because, in addition to causing some dehydrogenation, they also cause considerable aromatization and cracking. Separation of usch undesirable products from olefins is very tedious and expensive. Furthermore, few relatively efficient methods of separation are available which are generally outside the scope of commercial use. It is, therefore, readily apparent that new processes for the dehydrogenation of paraffins to olefins must be developed which will accomplish the dehydrogenation with minimum aromatization and/or cracking.

It is, therefore, an object of this invention to provide a new process for the dehydrogenation of paraffin hydrocarbons having six or more carbon atoms. A more particular object is to provide a process for the catalytic dehydrogenation of n-paraffins having from 10 to 18 carbon atoms whereby relatively good yields of monoolefin hydrocarbons are obtained with minimum aromatization and cracking. Additional objects will become apparent from the following detailed description.

The above objects are accomplished by providing a process for the dehydrogenation of n-paraffins having 6 to 24 carbon atoms to the corresponding olefins, said process comprising contacting a feed containing at least one said n-paraffin with a catalyst consisting substantially of from 30 to 100 weight percent of an active ingredient consisting of a mixture of 20 to 70 weight percent chromium dioxide, 0.5 to 25 weight percent cupric oxide, and 5 to 45 weight percent magnesium dioxide and from zero to 70 weight percent of a catalyst support selected from the group consisting of alumina, magnesia, and silica; the process being carried out at a temperature from 400 to about 560° C., at a pressure of from about 0.1 to about 50 atmospheres, and at a space velocity of from 0.2 to 6 liquid volumes of paraffin feed per hour per volume of catalyst.

The active ingredient in the catalysts of this invention is a mixture of chromium oxide, cupric oxide, and manganese dioxide, each of which may be used in the ranges mentioned above. The more preferred range of said oxides is 30 to 50 weight percent of chromium oxide, 5 to 15 weight percent of cupric oxide, and 10 to 35 weight percent of manganese dioxide. This ternary mixture of oxides achieves unusual stability under the reaction conditions as compared to the mixture of oxides having less than three components. Preferably, the catalysts may contain supports such as alumina, magnesia, and silica. In general, the active ingredient is employed in the amount of from 30 to 100 weight percent whereas the support is employed in the amount of from zero to 70 weight percent.

It is believed that chromium oxide is primarily chromic oxide, $Cr_2O_3$, but I do not wish to limit myself solely to this oxide because other oxides of chromium, such as chromium dioxide and chromous oxide, may also be present.

Alumina, magnesia, and silica may be prepared by any known methods in the art. These ingredients usually have a surface area in the range of from 5 to about 200 square meters per gram. The catalyst may be used in a fixed, moving, or fluidized bed.

The catalysts of this invention may be prepared in any manner available in the art. One method of preparing the catalysts is, for example, by merely blending the active ingredient with the inert ingredients, if such are employed. Another method of preparation which may be employed comprises suspending, for example, hydrated oxides of manganese, chromium, and copper in ammonium hydroxide and adding thereto aluminum nitrate. The resulting mixture is filtered and the solid obtained is calcined at a temperature of from 500 to 900° C. The same method may be employed in preparing analogous zirconium and hafnium compounds.

Co-precipitation may also be employed in preparing the catalysts of this invention. In this method, compounds of chromium, manganese, or copper, which will form hydrated chromium, manganese or copper oxides when contacted with aqueous alkaline solution, may be used. Such compounds may be, for example, chlorides, nitrates, acetates, and other similar compounds. Such compounds are added to an aluminum hydroxide suspension in ammonium hydroxide. As previously described, the resulting mixture is filtered and the solid dried and calcined.

A variation of the above described co-precipitation method comprises contacting solutions of the nitrates of chromium, manganese, and copper with the solution of ammonium carbonate. The resulting precipitate is filtered, dried, and calcined at a temperature of from 300° C. to 500° C.

In practicing the present invention, the process is carried out at a temperature from 400 to 560° C., preferably from 425 to 525° C., and most preferably from 450 to 510° C.

The pressure at which the present invention is operable is from 0.1 to about 50 atmospheres, but preferably, it is from 0.5 to 10 atmospheres, and most preferably from 0.5 to 2.0 atmospheres.

With respect to the space velocity at which contact between the hydrocarbon feed and the catalyst may be carried out, it may range from 0.2 to about 10 liquid volumes of feed per hour per volume of catalyst. Preferably, space velocity should be from 0.5 to 6.0 volumes of feed per hour per volume of catalyst.

The hydrocarbons employed in this process as a feed material are n-paraffins having from 6 to about 24 carbon atoms such as n-hexane, n-heptane, n-decane, n-dodecane, n-hexadecane, n-octadecane, n-eicosane, and n-tetraeicosane. The preferred paraffins are those having from 10 to 18 carbon atoms.

The unexpected result of the catalysts of this invention is that in addition to producing monoolefins in relatively good yields, only a very small amount of aromatization occurs. The process of this invention, therefore, is economical since such small amounts of aromatic products may generally be tolerated for commercial purposes, and thus, the need for expensive and tedious separation steps is eliminated.

In practicing the present invention, inert gaseous diluents such as nitrogen, carbon dioxide, ethylene, or steam may be advantageously employed. In many instances, the use of said diluents increases the yield of the resulting olefin by as much as 10% or more. The common ratio of a diluent to the paraffin feed, in moles, is in the range of from 1:1 to 5:1 or more. When the ratio is 1:1, the dilution factor is said to be 1, and when the ratio is, for example, 5:1, the dilution factor is said to be 5.

The following examples further serve to illustrate the process of this invention but do not limit it. All parts and percentages are by weight unless otherwise noted.

*Example 1*

A feed consisting essentially of n-dodecane was brought into contact with a catalyst containing 42 weight percent of chromium oxide, 7 weight percent of cupric oxide, 28 weight percent of manganese dioxide, and 23 weight percent of alumina. The contact between the dodecane and the catalyst was at a space velocity of 2.0 liquid volume per hour per volume of catalyst and at a temperature of 470° C., with the pressure being approximately atmospheric. The resulting dehydrogenation products represented a dodecene yield of about 76% based on the paraffin conversion of 12%. The aromatic yield was about 8.5% and the cracking products resulted in about a 15.5% yield.

A similar olefin yield is obtained when the catalyst containing 20 weight percent chromium oxide, 15 weight percent cupric oxide, 5 percent by weight manganese dioxide, and 60 weight percent alumina is employed in the above example.

*Example 2*

The feed, catalyst, temperature, and pressure were the same as in Example 1. The space velocity, however, was increased to 4 liquid volumes of feed per hour per volume of catalyst. The dehydrogenation products and yields obtained were: dodecene, 89%; aromatics, 0%; cracking products, 11%. The yields are based on the paraffin conversion of 5.4%.

A slightly lower olefin yield is obtained when, in the above example, the catalyst having 30 weight percent chromium oxide, 5 weight percent cupric oxide, and 15 weight percent manganese dioxide, and 50 weight percent alumina is employed.

*Example 3*

The feed, catalyst, and pressure were the same as in Example 1. The temperature, however, was increased to 500° C., and the space velocity was decreased to 1.5 liquid volumes of feed per hour per volume of catalyst. The dehydrogenation products and yields based on 12.2% paraffin conversion were: dodecene, 62%; aromatics, 12%; cracking products, 26%.

*Example 4*

Example 3 was repeated with space velocity being increased to 3 liquid volumes of feed per hour per volume of catalyst. Based on 7.5% paraffin conversion, the yields of dodecene, aromatics, and cracking products were 63%, 6%, and 31% respectively.

Substantially the same dehydrogenation results are obtained when the catalyst having the composition of 50 weight percent chromium oxide, 0.5 weight percent cupric oxide, 35 weight percent manganese dioxide, and 14.5 weight percent alumina is employed.

*Example 5*

An n-dodecane feed diluted with nitrogen to give a dilution factor of one, was brought into contact with a catalyst containing 42 weight percent chromium oxide, 7 weight percent cupric oxide, 28 weight percent manganese dioxide and 23 weight percent alumina. The contact between the feed and the catalyst was at a space velocity of 1.05 liquid volumes dodecane per hour per volume of catalyst at a temperature of 500° C. and with the pressure being approximately atmospheric. The resulting dehydrogenation products represented a dodecene yield of 67% based on the paraffin conversion of 12%. The aromatic yield was 13% and cracking products 20%.

An analogous result is obtained when the hydrocarbon feed is composed of n-dodecane, n-tridecane, n-tetradecane, and n-pentadecane and the catalyst is composed of 45 weight percent chromium oxide, 10 weight percent cupric oxide, 30 weight percent manganese dioxide, and 15 weight percent alumina.

*Example 6*

The feed, catalyst, temperature and pressure were the same as in Example 5. The dilution factor was 2.0, and the space velocity was 0.7 liquid volume of feed per hour per volume of catalyst. The dehydrogenation products represented a dodecene yield of 67%, aromatics 11%, and cracking products, 22%. The yields are based on the paraffin conversion of 13.7%.

Similar results are obtained when the catalyst having the composition of 50 weight percent chromium dioxide, 15 percent cupric oxide, and 35 weight percent manganese dioxide is employed in the above example.

*Example 7*

The feed, catalyst, temperature and pressure were the same as in Example 5. The dilution factor was 4, and space velocity was 0.4 liquid volume of feed per hour per volume of catalyst. The yield of dodecene was 66% based on 16.8% conversion of paraffins and the yield of aromatics and cracking products were 18% and 16% respectively.

A similar result is obtained when, in the above example, steam is used as the diluent.

*Example 8*

The feed, catalyst, temperature, pressure and dilution factor was the same as in Example 5. The space velocity was 0.7 liquid volume of feed per hour per volume of catalyst. The yield of dodecene was 84% based on the 8.7% conversion of paraffins, the yield of aromatics was 0% and the yield of cracking products was 16%.

Substantially the same result is obtained when carbon dioxide is employed as the diluent.

The products produced by the process of this invention are mixtures of monoolefin isomers having the same number of carbon atoms as the paraffin starting material. Thus, when n-dodecane is used as the paraffin feed, the product obtained would be a mixture of dodecene isomers.

The olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other olefins produced by this process can be ozonized to yield the corresponding acids. When ozonizing the products of the process of this invention, the reaction is generally carried out at a low temperature; e.g., from −50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the novel catalysts, their mode of preparation, and the novel function thereof, as well as the process employing these catalysts, it is desired that this invention be limited only within the lawful scope of the appended claims.

I claim:

1. A process for the dehydrogenation of n-paraffins having from 6 to 24 carbon atoms to the corresponding monoolefins, said process comprising contacting a feed containing at least one n-paraffin with a catalyst consisting substantially of from 30 to 100 weight percent of an active ingredient consisting of a mixture of 20 to 70 percent by weight chromium oxide, 0.5 to 25 percent by weight cupric oxide, and 5 to 45 percent by weight manganese dioxide, and from 0 to 70 weight percent of a catalytic support selected from the group consisting of alumina and magnesia; said process being carried out at a temperature from about 400 to about 560° C.

2. The process of claim 1 wherein said catalyst consists of from 30 to 100 weight percent of an active ingredient consisting of 55 weight percent chromium oxide, 9 weight percent cupric oxide, and 36 weight percent manganese dioxide, and from 0 to 70 weight percent alumina as the support; said process being carried out at a pressure of from 0.1 to 50 atmospheres and at a space velocity of from 0.2 to 10 liquid volumes of paraffin feed per hour per volume of catalyst.

3. The process of claim 2 wherein said catalyst consists of 77 weight percent of an active ingredient and 23 weight percent of alumina as the support; said process being carried out at a temperature of from 450 to 510° C., at an atmospheric pressure, and at a space velocity of from 0.5 to 6 liquid volumes of paraffin feed per hour per volume of catalyst.

4. The process of claim 3 wherein said paraffin feed is diluted with an amount of nitrogen in the range of from 1 to 5 moles of nitrogen per mole of paraffin feed.

5. The process of claim 3 wherein said paraffin feed comprises paraffins having 10 to 18 carbon atoms.

6. The process of claim 3 wherein said paraffin feed is n-dodecane.

7. The process of claim 2 wherein said catalyst consists of 100 percent active ingredient consisting of 50 weight percent chromium oxide, 15 weight percent cupric oxide and 35 weight percent manganese dioxide.

References Cited
UNITED STATES PATENTS

| | | | |
|---|---|---|---|
| 2,377,113 | 5/1945 | Thomas | 260—683.3 |
| 3,148,228 | 9/1964 | Franz et al. | 260—683.3 |

DELBERT E. GANTZ, *Primary Examiner.*

G. E. SCHMITKONS, *Assistant Examiner.*